(12) United States Patent
Bierner et al.

(10) Patent No.: US 8,463,648 B1
(45) Date of Patent: Jun. 11, 2013

(54) METHOD AND APPARATUS FOR AUTOMATED TOPIC EXTRACTION USED FOR THE CREATION AND PROMOTION OF NEW CATEGORIES IN A CONSULTATION SYSTEM

(75) Inventors: Gann Bierner, Oakland, CA (US); Edwin Cooper, Oakland, CA (US)

(73) Assignee: Pearl.com LLC, San Francisco, CA (US)

( * ) Notice: Subject to any disclaimer, the term of this patent is extended or adjusted under 35 U.S.C. 154(b) by 0 days.

(21) Appl. No.: 13/464,167

(22) Filed: May 4, 2012

(51) Int. Cl.
*G06Q 30/00* (2012.01)
(52) U.S. Cl.
USPC ....................... 705/14.44; 707/765
(58) Field of Classification Search
USPC ......................................................... 705/14
See application file for complete search history.

(56) References Cited

U.S. PATENT DOCUMENTS

| | | | |
|---|---|---|---|
| 2002/0023144 A1* | 2/2002 | Linyard et al. | 709/218 |
| 2004/0083224 A1* | 4/2004 | Yoshida | 707/100 |
| 2010/0057569 A1* | 3/2010 | Cantelmo et al. | 705/14.55 |
| 2010/0235311 A1* | 9/2010 | Cao et al. | 706/46 |
| 2011/0078167 A1* | 3/2011 | Sundaresan et al. | 707/765 |
| 2011/0131283 A1* | 6/2011 | Canning et al. | 709/206 |

* cited by examiner

*Primary Examiner* — John G Weiss
*Assistant Examiner* — Eric Netzloff
(74) *Attorney, Agent, or Firm* — Zilka-Kotab, PC

(57) ABSTRACT

Embodiments of the present invention further provide systems and methods for automatically identifying and extracting topics from questions posted by users to a consultation system, for creating a new consultation category or creating new keywords for of promotion of a new category serving an underserved or unserved topic.

9 Claims, 9 Drawing Sheets

METHOD AND APPARATUS FOR AUTOMATED TOPIC EXTRACTION USED FOR THE CREATION AND PROMOTION OF NEW CATEGORIES IN A CONSULTATION SYSTEM

RELATED APPLICATIONS

The present application is related to U.S. patent application Ser. No. 12/854,838 filed on Aug. 11, 2010, U.S. patent application Ser. No. 12/854,836 filed on Aug. 11, 2010, U.S. patent application Ser. No. 12/854,849 filed on Aug. 11, 2010, and U.S. patent application Ser. No. 12/854,846 filed on Aug. 11, 2010, which are all incorporated herein by reference. The present application is also related to and incorporates by reference the below applications filed on the same day as the present invention, and entitled "Method and Apparatus for creation of web document titles optimized for search engines," "Method and apparatus for identifying and eliciting missing question details in a consultation system," "Method and apparatus for identifying customer service and duplicate questions in an online consultation system," and "Method and apparatus for identifying similar questions in a consultation system," by the same inventors, Gann Bierner and Edwin Cooper, and the application entitled "Method and apparatus for predicting question answerability in an online consultation system," by Gann Bierner as the inventor.

FIELD

The present application relates generally to the field of computer technology and, in specific exemplary embodiments, to methods and systems for automatically extracting topics and creating and promoting new categories in a consultation system.

BACKGROUND

Presently, many online websites allow for exchange of information. Some of these websites provide a question and answer type capability whereby a user may post a question and one or more other users may reply. Often, any user on the Internet may be able to post the reply. Success of the online consultation system is based on the quality of service it provides. The quality of service is dependent on having adequate numbers of qualified experts available in relevant topics, in order to provide timely responses to user asked questions. A first step in identifying relevant topics and categories where qualified experts can answer users' questions is to identify un-served or under-served categories of questions. Once un-served or under-served categories are identified, relevant categories may be created, qualified experts can be recruited and/or relevant topics may be promoted through advertisement by identifying relevant keywords.

BRIEF DESCRIPTION OF DRAWINGS

The appended drawings are merely used to illustrate exemplary embodiments of the present invention and cannot be considered as limiting its scope.

DETAILED DESCRIPTION

Figure 1:
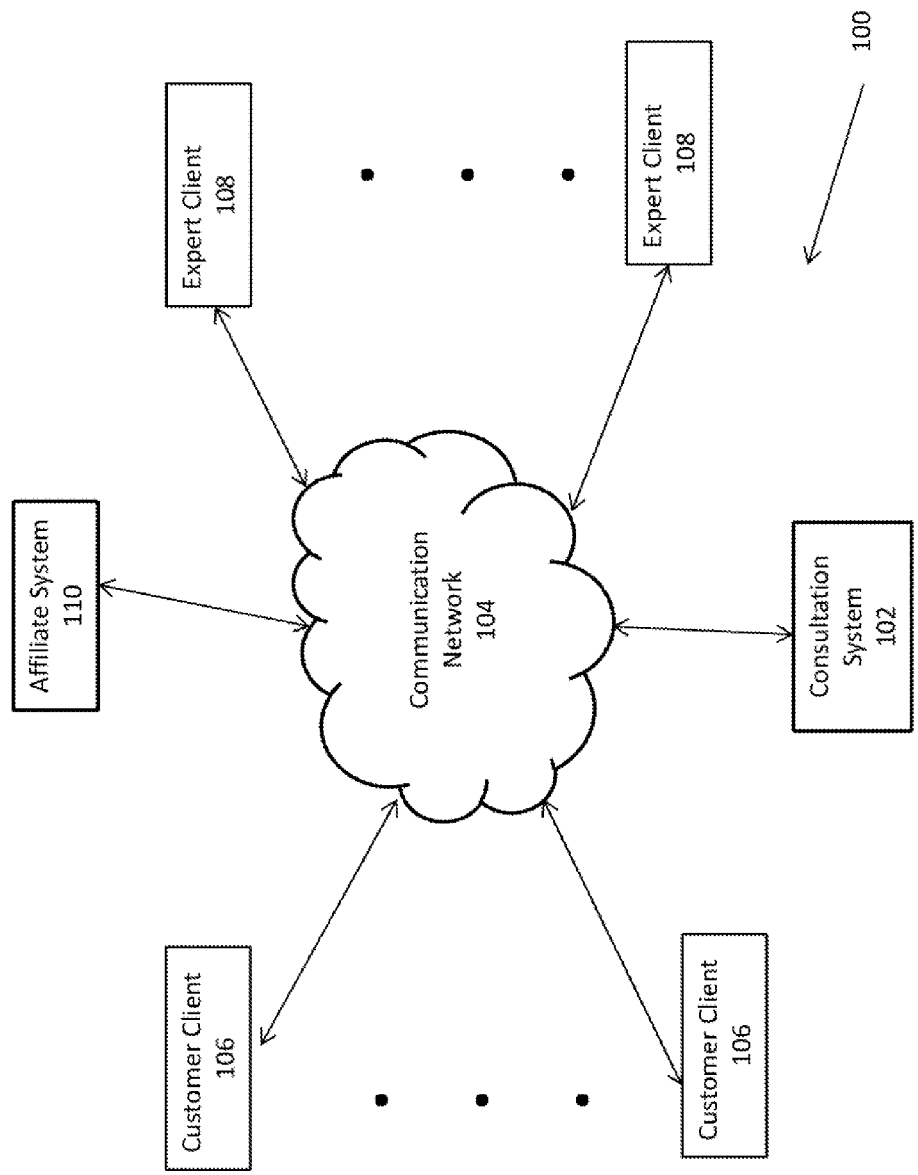
FIG. 1 is a diagram of an exemplary environment in which embodiments of the present invention may be practiced.

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on quality control of experts, the embodiments are given merely for clarity and disclosure. Alternative embodiments may employ other systems and methods and are considered as being within the scope of the present invention.

Embodiments of the present invention provide systems and methods for identifying under-served and un-served topics and/or using relevant keywords to promote categories related to such topics. In exemplary embodiments, answered and unanswered questions are analyzed to identify keywords and relevant topics. Based on the analysis, new categories may be created to service unanswered questions, additional experts may be recruited to service under-served categories, or keywords may be used in promoting a category or topic.

Embodiments of the present invention further provide systems and methods for automatically identifying and extracting topics from questions posted by users, and creating a new consultation category (also referred to as fling category), based on the results or creating new means of promoting a given category in the consultation system. In exemplary embodiments, a selection to create a new category is received from a creator. In one embodiment, the identification of new categories to be created is based on an analysis of unanswered questions posted by users of the consultation system, and automatically extracting the particular topic of interest that may be common to a group of unanswered questions and thus identifying the need for creating a new topic category to service the users interested in posting questions to it. Alternatively, embodiments of the automated topics extraction system and method may identify under-served topic categories and means to enhance or promote them. In an alternative embodiment, questions are analyzed to identify keywords that may be used in advertising and promotion of a given category, for example pay per click (PPC) online advertising. Due to the large volume of questions generated in a typical successful online consultation system, an automated system may be the only truly feasible method of addressing these goals.

FIG. 1 shows an exemplary environment 100 in which embodiments of the present invention may be practiced. The exemplary environment 100 comprises a consultation system 102 coupled via a communications network 104 to one or more users 106 and expert users 108. User 106, client, customer, customer client refers to a user of the consultation system 102. The communication network 104 may comprise one or more local area networks or wide area networks such as, for example, the Internet and telephone systems.

In exemplary embodiments, the consultation system 102 provides a forum where users may post or pose questions for which experts may provide answers. The consultation system 102 may provide the forum via a website. In some embodiments, at least portions of the forum (e.g., asking of questions or receiving of responses) may occur via the website, mobile phone, other websites, text messaging, telephone, video, VoIP, or other computer software applications. Because the consultation system 102 is network based e.g., Internet, public switched telephone network (PSTN), cellular network), the users using the consultation system 102 and experts providing answers may be geographically dispersed (e.g., may be located anywhere in the world). As a result an expert may provide answers to a user thousands of miles away. Additionally, the consultation system 102 allows a large number of users and experts to exchange information at the same time and at any time.

By using embodiments of the present invention, a user posting a question may easily obtain a tailored answer. Accordingly, one or more of the methodologies discussed herein may obviate a need for additional searching for answers, which may have the technical effect of reducing computing resources used by one or more devices within the system. Examples of such computing resources include, without limitation, processor cycles, network traffic, memory usage, storage space, and power consumption.

In various embodiments, a user may pose a question and one or more experts may provide answers. In various embodiments, the question may be matched with a category of experts, more specific set of experts, or even individual experts, sometimes on a rotating basis by user selection, a keyword based algorithm, a quality based algorithm (or score or rating), or other sorting mechanism that may include considerations such as, for example, likely location or time zone. A back-and-forth communication can occur. The user may accept an answer provided by one or more of the experts. In an alternative embodiment, the user may be deemed to have accepted the answer if the user does not reject it. By accepting the answer, the user validates the expert's answer which, in turn, may boost a score or rating associated with the expert. The user may also pay the expert for any accepted answers and may add a bonus. The user may also leave positive, neutral or negative feedback regarding the expert. More details regarding the consultation system 102 and its example functions will be discussed in connection with FIG. 2 below.

The exemplary user 106 is a device associated with a user accessing the consultation system 102 (e.g., via a website, telephone number, text message identifier, or other contact means associated with the consultation system 102). The user may comprise any individual who has a question or is interested in finding answers to previously asked questions. The user 106 comprises a computing device (e.g., laptop, PDA, cellular phone) which has communication network access ability. For example, the user 106 may be a desktop computer initiating a browser for access to information on the communication network 104. The user 106 may also be associated with other devices for communication such as a telephone.

In exemplary embodiments, the expert user 108 is a device associated with an expert. The expert, by definition, may be any person that has, or entity whose members have, knowledge and appropriate qualifications relating to a particular subject matter. Some examples of expert subject matters include health (e.g., dental), medical (e.g., eye or pediatrics), legal (e.g., employment, intellectual property, or personal injury law), car, tax, computer, electronics, parenting, relationships, and so forth. Almost any subject matter that may be of interest to a user for which an expert has knowledge and appropriate qualifications may be contemplated. The expert may, but does not necessarily need to, have a license, certification or degree in a particular subject matter. For example, a car expert may have practical experience working the past 20 years at a car repair shop. In some embodiments, the expert may be a user (e.g., the expert posts a question).

The expert user 108 may comprise a computing device (e.g., laptop, PDA, cellular phone) which has communication network access ability. For example, the expert user 108 may be a desktop computer initiating a browser to exchange information via the communication network 104 with the consultation system 102. The expert user 108 may also be associated with other devices for communication such as a telephone.

In accordance with one embodiment, an affiliate system 110 may be provided in the exemplary environment 100. The affiliate system 110 may comprise an affiliate website or other portal which may include some of the components of the consultation system 102 or direct their users to the consultation system 102. The affiliate system 110 may also be associated with other devices for communication such as a telephone. For example, the affiliate system 110 may provide a website for a car group. A link or question box may be provided on the affiliate website to allow members of the car group to ask questions. Answers in response to the questions may be provided, in part, from the consultation system 102, or the member asking the question may be directed to the consultation system 102 for the answer. The members may, in some cases, only have access to certain categories or experts. In one embodiment, a RSS feed may be used to feed data from the consultation system 102 to the affiliate system 110. The users of the affiliate system 110 may be tagged with the affiliate depending on if and how the users are registered with the consultation system 102. It should be noted that the affiliate system 110 may comprise any type or category of affiliate sites. In some cases, the affiliate system 110 may involve questions being answered by the affiliate or persons involved with the affiliate. Discussion on creating an affiliate relationship with the consultation system 102 is provided in more detail below.

The environment 100 of FIG. 1 is exemplary. Alternative embodiments may comprise any number of consultation systems 102, users 106, expert users 108, and affiliate systems 110 coupled together via any type of one or more communication networks 104, and still be within the scope of exemplary embodiments of the present invention. For example, while only one consultation system 102 is shown in the environment 100, alternative embodiments may comprise more than one consultation system 102. For instance, the consultation systems 102 may be regionally established.

Figure 2:
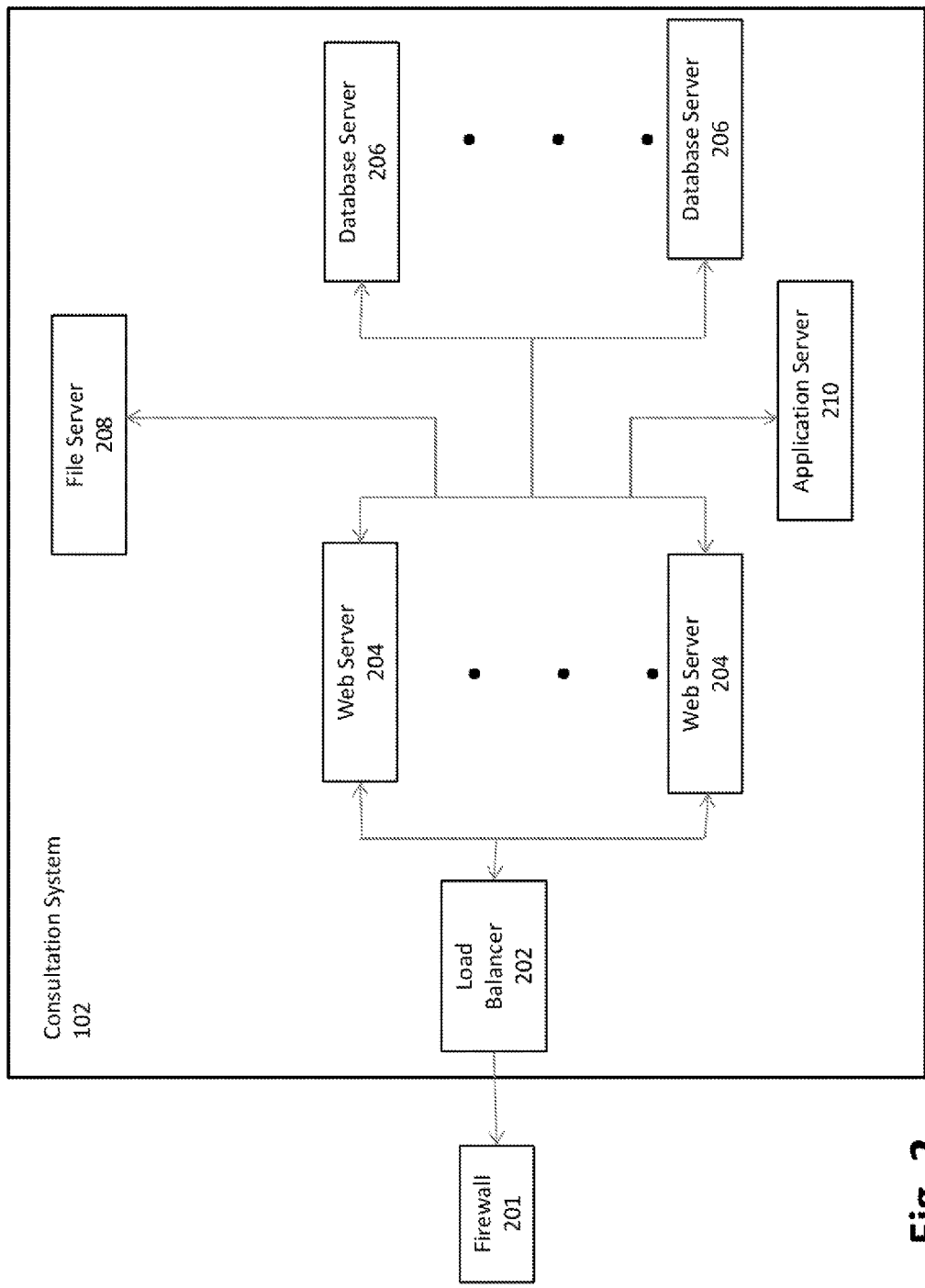
FIG. 2 is a block diagram of an exemplary consultation system.

Referring now to FIG. 2, the consultation system 102 is shown in more detail. In exemplary embodiments, the consultation system 102 may comprise a load balancer 202 which distributes work between two or more web servers 204 in order to optimize resource utilization and minimize response time. In some embodiments, a firewall 201 may be provided prior to the load balancer 202.

In exemplary embodiments, the web servers 204 are responsible for accepting communications from the user 106 (e.g., request or question) and expert user 108 (e.g., response) and serving the response including data content. In some instances, the request and response may be in HTTP or HTTPS which will result in HTML documents and linked objects (e.g., images) being provided to the user and expert users 106 and 108. The communications may include, for example, questions from the users, answers from the experts, acceptance from the user, payment information, account update information, videos, documents, photographs and voice. The web server 204 will be discussed in more detail in connection with FIG. 3.

Information used by the web server 204 to generate responses may be obtained from one or more database servers 206 and a file server 208. The exemplary database servers 206 store data or are coupled with data repositories storing data used by the consultation system 102. Examples of data include user information (e.g., username, e-mail address, credit card or other payment information), expert information (e.g., name, licenses, certifications, education and work history), previously asked questions and corresponding answers, and transaction information (e.g., payment, accepts, etc.). Essentially any data may be stored in, or accessed by, the database servers 206 including every user and expert interaction with the consultation system 102. Examples of interactions include how many questions the user has asked, which experts provided answers to the questions, and whether the user accepted the answers and paid the expert.

Content on the database servers 206 (or accessed by the database servers 206) may be organized into tables, and the tables may be linked together. For example, there may be one table for every question that has been previously asked, another table for posts (e.g., answers) to each question, and other tables for users and experts. In one example of the present invention, over 430 tables or spreadsheets are linked together.

In some embodiments, the database servers 206 may include logic to access the data stored in the tables. The logic may comprise a plurality of queries (e.g., thousands of queries) that are pre-written to access the data. For example, one query may be directed to determining every question that a particular user has asked. In this example, a user table may be searched based on this query to determine the user's unique user name or identity. Once the user name is determined, a question table may be accessed to find all questions ever asked by a user having the particular user name.

It should be noted that the functions of the database server 206 may be embodied within the web server 204. For example, the database servers 206 may be replaced by database storage devices or repositories located at the web servers 204. Therefore, any reference to the database server 206 and database storage device are interchangeable. Alternatively, some or all of the query logic may be embodied within the web server 204.

In exemplary embodiments, a plurality of database servers 206 is provided. The plurality of database servers 206 may share data and thus be identical (or close to being identical). By having identical database servers 206, load balancing and database backup may be provided. For example, if two database servers 206 are embodied in the consultation system 102, then half of the data accesses or queries may be directed to one database server 206 and the other half to the second database server 206.

The file server 208 stores or accesses files such as, for example, pictures, videos, voice files, PDF documents, Word documents, and PowerPoint presentations. When a particular file is requested or required in order to generate a response, the web server 204 may query the file server 208 for the file. Alternatively, the files may be stored at the database server 206 or other database storage devices, for example.

An application server 210 may also be provided in the consultation system 102. The application server 210 may provide applications and functions that are centralized to the consultation system 102. For example, the application server 210 may perform credit card processing with a bank that is coupled to the consultation system 102 via a network (e.g., the communication network 104).

It should be appreciated that in alternative embodiments, the consultation system 102 may include fewer or more components than shown in FIG. 2. For example, the consultation system 102 may comprise any number of web servers 204, database servers 206, file server 208, and application server 210. In another example, the file server 208 and application server 210 may be removed from the consultation system 102 and their functions performed by other servers in the consultation system 102. It will also be appreciated that the various servers may be embodied within each other and/or the consultation system 102 may be embodied within a single server. For example, the database server 206 may be embodied, as a storage device within the web server 204. It is also noted that the various servers of the consultation system 102 may be geographically dispersed within the exemplary environment 100.

Figure 3:
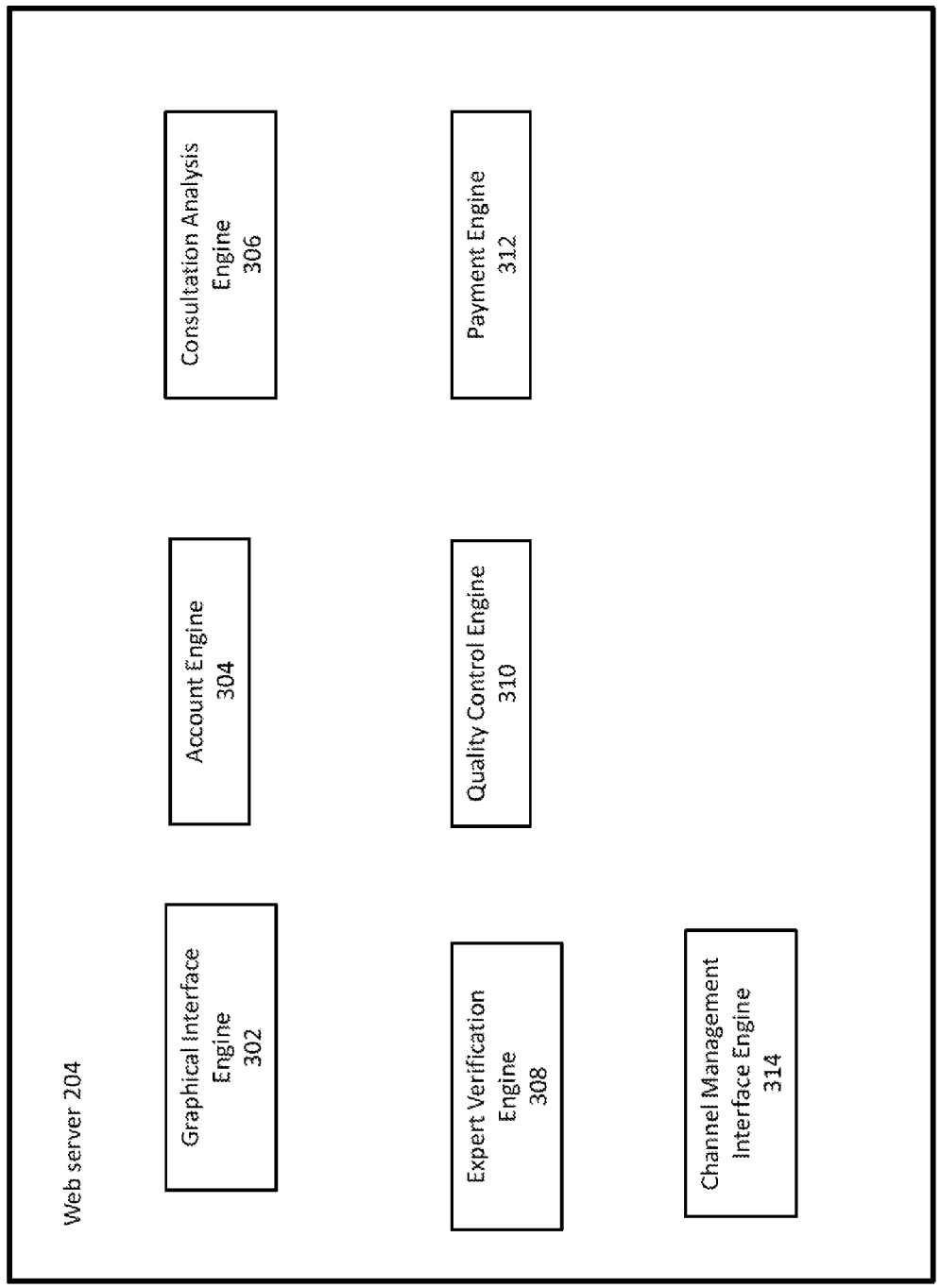
FIG. 3 is a block diagram of an exemplary web server.

Referring now to FIG. 3, one of the exemplary web servers 204 is shown in more detail. As discussed, the web servers 204 share in the workload in order to provide optimized performance. As such, each of the web servers 204 will include similar engines and modules. In the exemplary embodiment of FIG. 3, the web server 204 comprises a graphical interface engine 302, an accounts engine 304, a consultation analysis engine 306, an expert verification engine 308, a quality control engine 310, a payment engine 312, and a channel management engine 314 communicatively coupled together.

The exemplary graphical interface engine 302 generates graphical representations provided via the web page. In exemplary embodiments, the graphical interface engine 302 builds a page (e.g., made up of HTML, Javascript, CSS, sound, video, images, and other multimedia) that is presented to the user 106 or expert user 108. The page comprises static text (e.g., "Welcome to JustAnswer.") and dynamic data (e.g., "Hello, hulagirl. You joined 3 months ago; have asked 17 questions; have accepted 12 answers."). The dynamic data may be obtained, at least in part, from the database servers 206. In exemplary embodiments, the dynamic data may be retrieved using querying logic associated with the web server 204, the database server 206, or a combination of both, as discussed above.

The exemplary accounts engine 304 sets up, and maintains user accounts with the consultation system 102. Initially, the accounts engine 304 may provide a registration page via the graphical interface engine 302 for an individual (e.g., a user or expert) to fill out. The information collected via the registration page may be stored in the database server 206. Examples of information include user name, e-mail address, and billing and payment information. With respect to experts, the accounts engine may also collect information regarding the identity of the expert, information on credentials (e.g., license and certification numbers, degrees including university attended and years of attendance, employment history), and other data relating to the expert and the expert's application. Accounts for users may be automatically established and activated based on certain actions taken by the user, such as asking a question, agreeing to the terms of the consultation system, or providing payment. However, experts, in accordance with exemplary embodiments, proceed through an acceptance and verification process. If accepted, an expert account may then be established and activated by the accounts engine 304. The verification process will be discussed in more detail below.

The consultation analysis engine 306 manages answers in response to questions which have been posted to the consultation system 102. In exemplary embodiments, the consultation analysis engine 306 will receive questions along with indications of a category or subject matter each question is directed to from users. In various embodiments, a user may utilize a question page to enter a question which the user wants an expert to answer. The question page may provide a field for entering the question, relevant information relating to the question (e.g. make and model of a car), as well as a selection box for selecting a subject matter expert under which the question should be posted to. In exemplary embodiments, other pages may be presented to the user before or after the question is submitted to experts, to obtain further data from or provide data to the user. For example, a question regarding how to change the battery in a certain type of car may be categorized as a car question or a question for that type of car. In some embodiments, the question will then be posted to a car care portion (e.g., car care web pages) of the consultation system 102. The question is also recorded into a corresponding table in the database server 206 (e.g., in a question table) and the user name of the user may also be entered into a corresponding table (e.g., user table). In some instances, the question may be outputted back to the user so that the user may confirm the question or edit the question if needed. The user may also provide an amount that the user is willing to pay for an accepted answer, in some embodiments, as an amount selected by the user from different options offered to the user. A discussion on creating new categories is provided in more detail below.

Once the question is posted on the consultation system 102, experts may provide answers in response to the question. The questions may be posted to a general or subject matter specific question list of recent questions that have been posted by users, a more specific group of experts, or certain experts one-at-a-time. In various embodiments, the question list may be sorted by certain types of information such as time of posting, the amount the user is willing to pay (e.g., value), the user's history of accepting previous answers, information regarding the subject matter of the question, or whether replies have been previously posted. Experts may periodically review the question list or other communications alerting them to questions to determine if there are any questions that the expert would like to answer. The expert may base their determination, in part, on the complexity of the question; their expertise, the amount the user is willing to pay for an answer, or the user's history of accepting previous answers. In various embodiments, the user is able to place a deposit and name a price for an answer when posting the question or place the deposit after an expert has answered.

Should the expert decide to answer a question or request further information, an indication is provided to the user that there is an answer being offered or a request for further information, sometimes in the form of the answer or the request itself. The indication may also comprise an e-mail, text message, or pop-up notification to the user. In some cases, the user may place a deposit (e.g., the amount agreed upon to be paid if an answer is accepted) after being given the opportunity to view a profile of the expert offering the answer or a portion of the answer.

The answer is provided to the user. The answer may be displayed on a web page (e.g., an answer page), provided via a chat session, provided via a voice or text message, provided via video, provided by a software application, provided by other social media means (e.g., social networking sites where the user has a personal profile or page), or provided by telephone, mobile phone, or VoIP. Upon review of answers posted in response to a question, the user decides if any of the answers are acceptable to the user. The user may accept one or more answers that are posted. In exemplary embodiments, the user will pay the expert posting any accepted answers. If a particular answer is exceptional, in exemplary embodiments, the user may also provide a bonus to the expert providing the exceptional answer. When the user accepts an answer, monies from the deposits may also be paid to a host of the question and answers platform (e.g., host of the consultation system 102).

In various embodiments, different pricing options may be used for determining what a user may pay for getting an answer to a question or what an expert may be paid for providing an answer. In one embodiment, the pricing options may vary for each category or subcategory based on a variety of factors. These factors may include, for example, question length, time of day, day of week, location, or the ability of a user to pay. Additionally, discounts may be offered (e.g., two for one, ask one question get second for 50% off, free for pro bono users). In other embodiments, pricing may be selected and paid for by third-parties (e.g. employers of the users). In yet other embodiments, a user may subscribe to a subscription plan (e.g., unlimited questions each month for a particular fee or up to 10 questions each month for another fee). In other embodiments, a user or expert may be allowed to adjust the price prior to, during, or after the interaction between the user and the expert.

Acceptance and non-acceptance actions are tracked by the consultation analysis engine 306. For example, every user's accept-to-question ratio may be tracked and may be published to experts. Thus, if the ratio is low, experts may not answer the user's questions in the future. Furthermore, the user's question posting privileges may be suspended or the user may be removed from the consultation system 102 if the ratio is low or falls below a ratio threshold. The tracked acceptance and non-acceptance information is stored to the database server 206, and may be used to evaluate the quality of the experts as is discussed herein.

The user may also provide comments and feedback after viewing or accepting one or more answers. The feedback may be provided as, for example, a written comment, star rating, numerical scale rating, or any other form of rating. The feedback is stored to the database server 206, and may be used in the quality control processing. User satisfaction surveys may also be sent to collect data on the user's experience with the site, the expert, or the answer the user received.

According to some embodiments, if the question has been previously answered, a query of the database server 206 may be performed. The answers to previously asked questions may be stored in corresponding answer tables in the database server 206. These embodiments may occur when, for example, a user searches (e.g., using Google) for previous questions and answers. Multiple instances of access to the same questions and/or answers may be provided via a cache. Some or all users may also be allowed to search some or all previous questions or answers via a search tool on the website, or some or all previous questions or answers may be displayed to users at the discretion of the host, affiliate, or expert of the consultation system.

The exemplary expert verification engine 308 performs verification and acceptance of experts. In accordance with exemplary embodiments, the expert verification engine 308 verifies information provided by the potential experts (or experts) or receives verification data used to verify the experts' identities or credentials. The verification may occur prior to allowing the expert to join the consultation system 102. Alternatively, the verification may occur any time after the expert has joined the consultation system 102. The verification engine 308 will be discussed in more detail in connection with FIG. 4 below. More than one verification may be performed for each expert, by requirement or by the expert's choice.

In exemplary embodiments, the quality control engine 310 evaluates experts in order to promote the high quality of experts in the consultation system 102. The evaluation may comprise scoring or ranking experts based on various elements. For example, the quality control engine 310 may access and review feedback associated with each expert and score each expert accordingly. The quality control engine 310 may also review other factors which may increase or decrease an expert's score or ranking. The quality control engine 310 will be discussed further in connection with FIG. 5.

The exemplary payment engine 312 manages pricing options and the payment of fees. In accordance with exemplary embodiments, users pay experts for accepted answers to their questions, for example, by way of payments per questions, payments per answers, payments per time frame, or payments on a subscription basis. In some instances, the user may provide a deposit in order to view answers prior to accepting the answers. The payment engine 312 may maintain a record of all these transactions. Additionally, the payment engine 312 may work with the application server 210, if provided, to process payments (e.g., credit card processing, PayPal processing).

The exemplary channel management engine 314 manages the creation of new channels in the consultation system 102. A new channel may comprise a new category or a new affiliate relationship on the consultation system 102. In some embodiments, the new category may be placed on a test site of the consultation system 102. However, questions may be posted to a main site of the consultation system 102 so that experts on the main site may also provide responses to the questions. Should the new category prove to be successful, the new category may then be moved to a main site of the consultation system 102. The new affiliate relationship results in the affiliate system 110 being linked to the consultation system 102. The extent of the link is determined by the affiliate as will be discussed further below.

Figure 4:
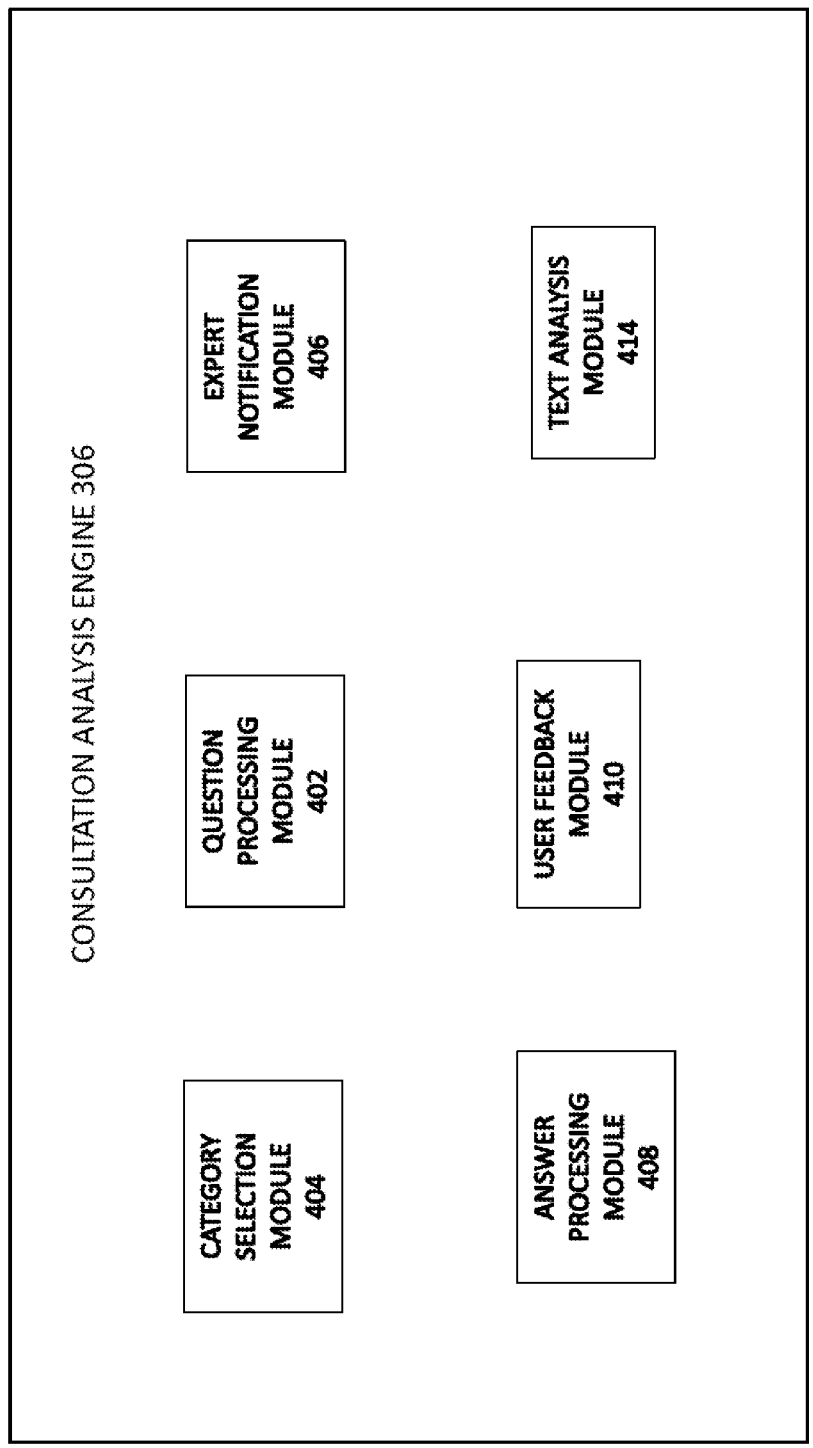
FIG. 4 is a block diagram of an exemplary channel management engine.

FIG. 4 is a block diagram of the channel management engine 314. The channel management engine 314 manages the creation of new channels on the consultation system 102. The new channel allows any third party (e.g., user, expert, affiliate) to create new categories and to route questions to categories of the consultation system 102 from locations both on and off the consultation system 102. In exemplary embodiments, the channel management engine 314 comprises a category data module 402, an expert data module 404, an affiliate data module 406, a channel creation module 410, a financial module 412, and a text analysis module 414, communicatively coupled together. It is noted that some of the modules of the channel management engine 314 may be embodied in other components of the consultation system 102. For example, the financial module 412 may be embodied within the payment engine 312 or the expert data module 404 may be embodied on the expert verification engine 308.

The category data module 402 manages data used in the creation of a new category. The category data module 402 receives category data from a creator of the new category. Examples of category data may include category name, related category, description of the category, and why the creator thinks it is a good category. The category data module 402 also provides category information to the creator. For example, the category data module 402 may provide a list of existing categories for review by the creator.

The expert data module 404 manages expert data associated with the new category. For example, the creator may become a founding expert (e.g., a first expert) in the new category. A founding expert may be required in order to establish a new category. In some cases, founding experts and experts associated with new channels on a test site of the consultation system 102 may not be verified by the expert verification engine 308.

The affiliate data module 406 manages information for the creation of a new affiliate relationship. The affiliate data may include user name, password, and contact information (e.g., email address, web site address) of an affiliate (e.g., an administrator of the affiliate). The affiliate data module 406 also provides affiliate data. For example, samples of other affiliates may be provided by the affiliate data module 406. The affiliate data module 406 may also manage agreement data (e.g., commission agreement, referral agreement, terms of service agreement) associated with each affiliate.

The channel creation module 410 creates the new category or affiliate relationship. In embodiments where a new category is being created for an expert or user (without affiliate relationship), the channel creation module 410 may automatically generate a landing page with a standard or customizable question box where users can enter questions. The channel creation module 410 may provide the creator with a text link, image link or code snippet with which the creator can promote via ads on web sites, social media sites, or their own website. By using the link, the creator may access questions in their new category.

In one embodiment, the new category is placed on a test site of the consultation system 102 by the channel creation module 410 until it proves successful (e.g., a certain number of questions are asked overall or within a certain time frame, a certain number or percentage of possible feedback received), at which time it may be moved to a main site of the consultation system 102, and subjected to all or a portion of the expert verification engine 308. In other embodiments, questions to the new channel on the test site may be dual categorized such that the questions are also listed in other test categories or in categories on the main site. This dual categorization allows for consolidation of similar or even identically named new categories, as well as for experts on the main site to respond.

With respect to creation of a new affiliate relationship, the channel creation module 410 allows the creator to provide customization of its relationship. The customization may include, for example, a category to which to route questions and the type of question box or link to use to route users to the consultation system 102.

The financial module 412 manages an online reporting tool to give affiliates access to account information regarding fees earned. In exemplary embodiments, the affiliate receives a percentage of fees that the users pay when the user is referred through the affiliate. The online reporting tool may report number of questions asked, number of responses accepted, account balance, and available balance.

In one exemplary embodiment of the present invention, a text analysis module 414 may be an independent module of the Channel Management Engine 314. In an alternative embodiment, the text analysis module 414 may be embodied in the category data module 402. In an alternative embodiment, the text analysis module 414 may be embodied as part of the channel creation module 410. In yet another embodiment the text analysis module 414 may be incorporated in the consultation analysis engine 306.

The text analysis module 414 applies a given model to texts it receives as input to text analysis module 414. A feature extraction component of the text analysis module 414 uses the input along with a desired set of rules to extract relevant features of the received input. The text analysis module 414 produces a desirable outcome based on the input and from the extracted features. In some implementation of the text analysis module 414, the given model may be perfected by allowing an iterative training to tweak and optimize the model. Additionally, in alternative embodiments, various smoothing operations may be performed to for example change extracted feature weights or drop non relevant features all together.

Furthermore, the text analysis module has the ability to recognize and output topics and their variants. Thus text analysis is not limited to a single word or phrase but includes variations on such identified words or phrases. For example, the identified topic "Yorkie," may also represent variants such as "Yorkshire terrier," or the identified topic "sewing machine" may include "sewing machines."

In other embodiments, new categories and new affiliate relationships can be created together through the channel creation module 410, such that, for example, an expert could create a new category in which she will be the founding expert, then customize a question box for the new category to be placed on the expert's affiliate website, through which the expert can route questions to herself as the affiliate for a certain time period (e.g., one hour) and then, if the questions are not yet answered within the certain time period, to the experts on the consultation system 102 and also dual categorized to a similar category on the main site.

In yet another embodiment, customized categories can be generated from existing categories, on one landing page, based on specific keywords or topics in users' questions search terms, manually selected preferences or the source pages from which the user arrived. For example, if a user searches for "bird" or has the word "bird" in a question, instead of sending the user to a more generic pet category, the user may be sent to a custom landing page that pulls together all categories that could relate to birds (e.g., parrots, chickens, ducks, parakeets, doves). Similarly, the user may navigate to a keyword specific landing page that covers multiple categories to post a question. Each category may comprise a tab from which the user may select. In addition, these custom landing pages may also have bird-specific experts displayed (e.g. bird focused veterinarians), bird specific public relations article sources (e.g. bird magazines), bird specific customer testimonials, bird specific questions as examples, bird specific marketing text (e.g., "Ask a Bird Question, Get an Answer ASAP" or "Over 1 Million Satisfied Bird Customers" or "Type your Bird Veterinarian Question Here"), and bird specific descriptions and keyword tags ("Wings, Webbed Foot, Feathers"). However, despite being assigned to a category, some questions may receive no answers because the questions are very specific and requires specialized knowledge on the part of the expert. For example, some questions may be underserved in their category, such as in Financial Software, questions about "quickbooks pro" like "How do you remove old vendor files from quickbooks pro 2009?" A specialized category may be created and/or relevant experts recruited.

Figure 5:
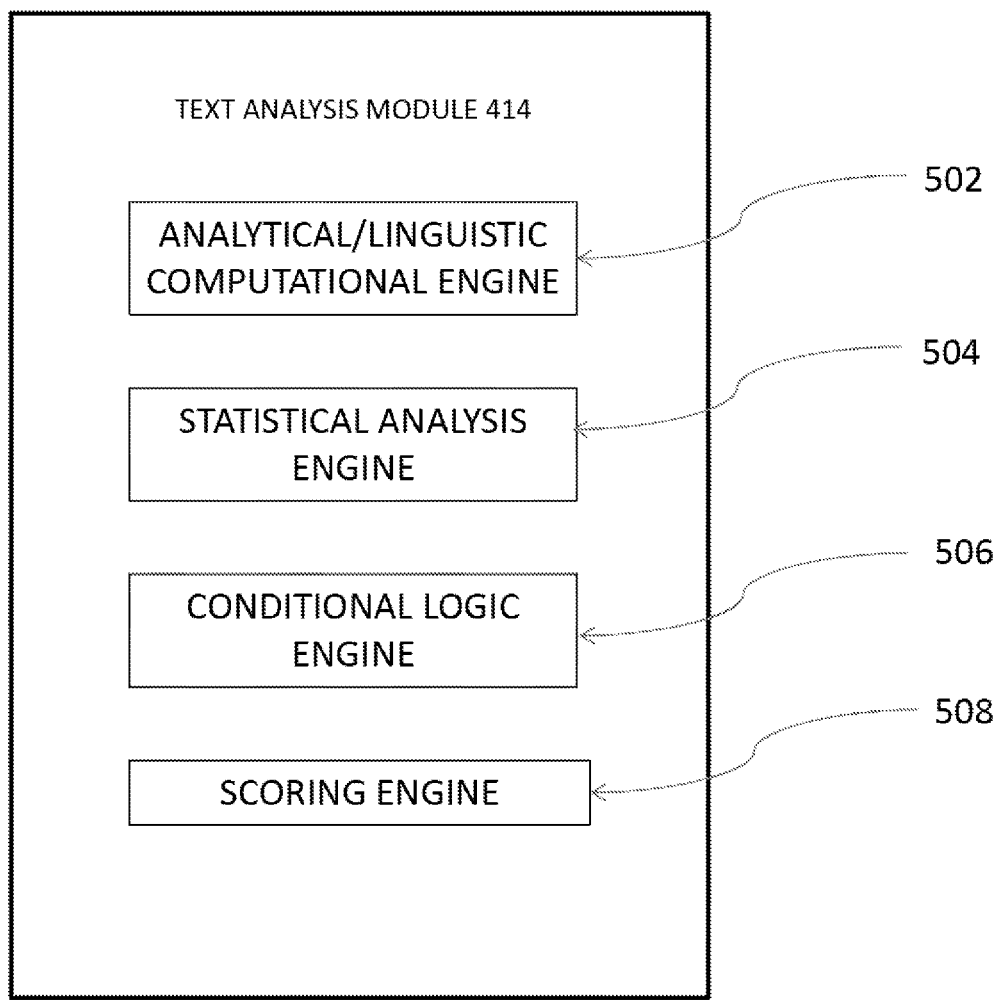
FIG. 5 is an exemplary block diagram of the text analysis module as applied to automated topic extraction.

FIG. 5 is an exemplary block diagram of the text analysis module as applied to automated topic extraction. In a consultation system, a certain percentage of questions asked never get answered, and one major reason for unanswered questions is the shortage of experts capable of answering the types of questions asked, or the lack of a relevant category to match the questions to. Therefore, it would be highly desirable to be able to identify those questions and corresponding topics which are not being answered so that more experts are recruited with adequate expertise in the topics corresponding to the unanswered questions, and/or create new categories (flings) corresponding to the topic of the unanswered questions, where the questions are isolated so that they can be better grouped and presented resulting in a higher rate of received answers by the existing experts available on the consultation system.

Alternatively, identifying topic keywords for use in promoting new or existing categories is also very desirable. In an exemplary embodiment of the present invention, automated topic extraction as applied to any user asked questions, including unanswered or under-served questions may be used to generate customized advertising and promotions and attract users and experts to for example a newly created, not very popular or existing category. Online advertising has become more and more popular and important. How and what to advertise greatly affects the success rate of the advertising. For example, online advertising groups may be tasked with creating ads (e.g., Google, Yahoo, etc.) to attract people to visit a consultation system's 102 web site. Pay per click or PPC advertising is one example of increasingly popular online advertising. PPC advertising is based on bidding for the keywords anticipated to result in the highest conversion rate from a search to an actual purchase of a product or service. Anticipating the right keywords to yield the best PPC conversion rate is a difficult task and due to the high cost of PPC advertising, it is highly desirable to create a system and method capable of identifying the most relevant PPC keywords corresponding to each question category thus resulting in the highest conversion rate. An example of a PPC advertisement may be, "Ask a lawyer about wills". So, it is fairly difficult to come up with good PPC ads without laboriously wading through questions and mining data sources. In fact, alternatives to using the systems and methods of the present invention involve a manual analysis, surveys, ad-hoc querying, etc. All of these exploration techniques have to rely on a human to have some knowledge of where to start and it would be tune consuming, unreliable and in most cases prohibitively expensive to implement due to the large size of data that may be generated every day. Furthermore, updating the analysis becomes an equally difficult task.

To further complicate matters, successful PPC advertising requires keywords that best target particular categories. For example, "Ask a lawyer about wills" targets the Estate Law category very well, but "brother" is a tricky one because it can refer to a type of printer, a sibling, or a kitchen appliance. In a nutshell, they need help finding words and phrases highly associated with particular categories that are actually things that users may care about and are likely to consult experts on.

As described herein above, one exemplary application of automatic topic extraction systems and methods of the present invention presents a solution for the problem of identifying under-served topics or creating and promoting the identified under-served categories corresponding to the identified topics. So, automated topic extraction systems and methods thought by embodiments of the present invention could result in the improvement of existing categories where the category may lack an adequate number of experts, or where the questions are not properly presented. By analyzing the unanswered questions, problem topics and the corresponding categories may be automatically identified allowing the recruitment of additional experts or better routing of the submitted questions related to the identified topics.

In yet another embodiment of the present invention, the topic extraction systems and methods of the present invention may be used to identify un-served topics and corresponding categories. Rather than just associating a question with its category for the purpose of extracting topics, automated topic extraction may only be applied to questions that did not receive a response. If a question did not receive a response, it is associated with a different version of its category. So, for example, a responded to question might be associated with "Appliance" while an unresponded to question is associated with "-Appliance". After topic extraction, topics associated with "-Appliance" are topics that are highly associated with appliance questions that aren't getting responses. This might, for example, identify "sewing machine" questions as a gap in subject category and expert knowledge, so a new category may be created for that topic and new experts may be recruited.

FIG. 5 shows an exemplary text analysis module as applied to automated topic extraction in more detail. The exemplary text analysis module 414 may include a computational linguistic engine 502, a statistical analysis engine 504, a conditional logic engine 506, and a scoring engine 508. "Computational linguistic engine 502" may also be referred to as "analytical/linguistic computation engine 502" or "linguistic engine 502."

In an exemplary embodiment of the present invention, the analytical/linguistic computational engine 502 performs computational linguistics to break down questions into their component parts and extract topics they contained. This engine breaks down a sentence into component parts of various levels of abstraction: words, phrases, parts of speech (e.g. noun, adjective, etc.), concepts, etc. A phrase may comprise several words included together. For the purposes of this invention, the candidate topics components are words and phrases. Word segmentation (identifying a sentence's component words) can be performed both algorithmically and statistically. In one exemplary embodiment of the present invention, a statistical modeling approach may be used to improve accuracy of the word segmentation. Likewise, phrases can be determined both algorithmically and statistically, and in some exemplary embodiment a blended algorithmic/statistical approach may be used. A simple version of the engine constructs all two and three word phrases that do not contain a stop word (a primarily functional word like "the" or "and" that contains limited semantic meaning). This phrasal extraction may produce low quality phrases. However, as further described below, the scoring engine 508 finds the most useful phrases and may discard the rest.

In one embodiment of the present invention, the statistical engine 504 may access the database of stored questions and computes the number of occurrences of tokens (i.e. words and phrases) in the large set of questions submitted to the consultation system 102. The statistical engine 504 may create various statistical models of the analyzed data, (e.g, a Bayesian model) in order to analyze the data collected.

In an exemplary embodiment of the present invention, the conditional logic engine 506 applies certain conditions to the identified topics to further refine the results. In exemplary embodiments, a threshold may be set such that only identified topics that appear in a given category more than 50% of the time are selected as candidate topics. For example, compared to all categories, "sewing machine" may appear more than 50% of the time in the Small Appliance category and therefore qualify as a candidate topic for that category. On the other hand, "brother" may appear 30% of the time in Relationships, 30% of the time in Family Law, and 40% of the time in Electronics and therefore does not satisfy this requirement to become a topic. This requirement ensures that a topic has an affinity for its category, ensuring a high degree of specificity while filtering out low quality topics. In alternative embodiment of the present additional logical conditions may be used to further filter the candidate topics. For example, it may also be required that a candidate topic appear at least a minimum number of times in all the questions. For example, candidate topics that occur only three times or less in all the questions are filtered out. Another filter may require that a topic appear a minimum percentage of times in the all the questions. For example, any candidate topic that appears less the 0.01% of the questions is ignored. These filters help eliminate topics that may fall below a minimum level of interest, allowing the system to further filter out noisy, low-quality topics. Additionally, it may also be required that a topic achieve a minimum score by the scoring engine 508, as further described below.

The scoring engine 508 may be used to score the candidate topics. In this case, a modified version of Term Frequency Inverse Document Frequency (TFIDF) may be used. TFID is a well-known scoring formula used commonly in information retrieval. TFIDF scoring is most commonly used in the context of document retrieval. When scoring a word or phrase for a given document, the standard TFIDF score is increased for every occurrence in the document (Term Frequency) and decreased for every document that contains it (Inverse Document Frequency). This favors documents about the term or phrase, but not as much if the term or phrase is seen in a lot of places, and therefore probably not very specific. In the exemplary embodiments of the present invention, frequencies of candidate topics are counted with respect to their occurrence in a given category, as opposed to a given document. For example, the word "yorkie" may have a relatively high score for the Vet category because it appears fairly frequently in the Vet category but rarely elsewhere. But a word like "the" may score relatively low because it is used frequently in every category. As these examples show, in exemplary embodiments of the present invention, scoring is applied to categories rather than documents. This allows the topic extraction system and method to associate topics with categories, and allows the topic extraction to target the selected categories during promotion and/or identify un-served or under-served categories. In the traditional information retrieval application of TFIDF, the topics would be associated with specific documents (in our case, questions), which have no inherent usefulness for this purpose. Furthermore, because of the similarity of many questions, using the traditional technique would yield substantially fewer quality topics. The scoring formula used in exemplary embodiments of the present invention is enhanced by including an IDF penalty, which penalizes unspecific topics even more allowing us to find specific, high-quality topics.

Figure 6:
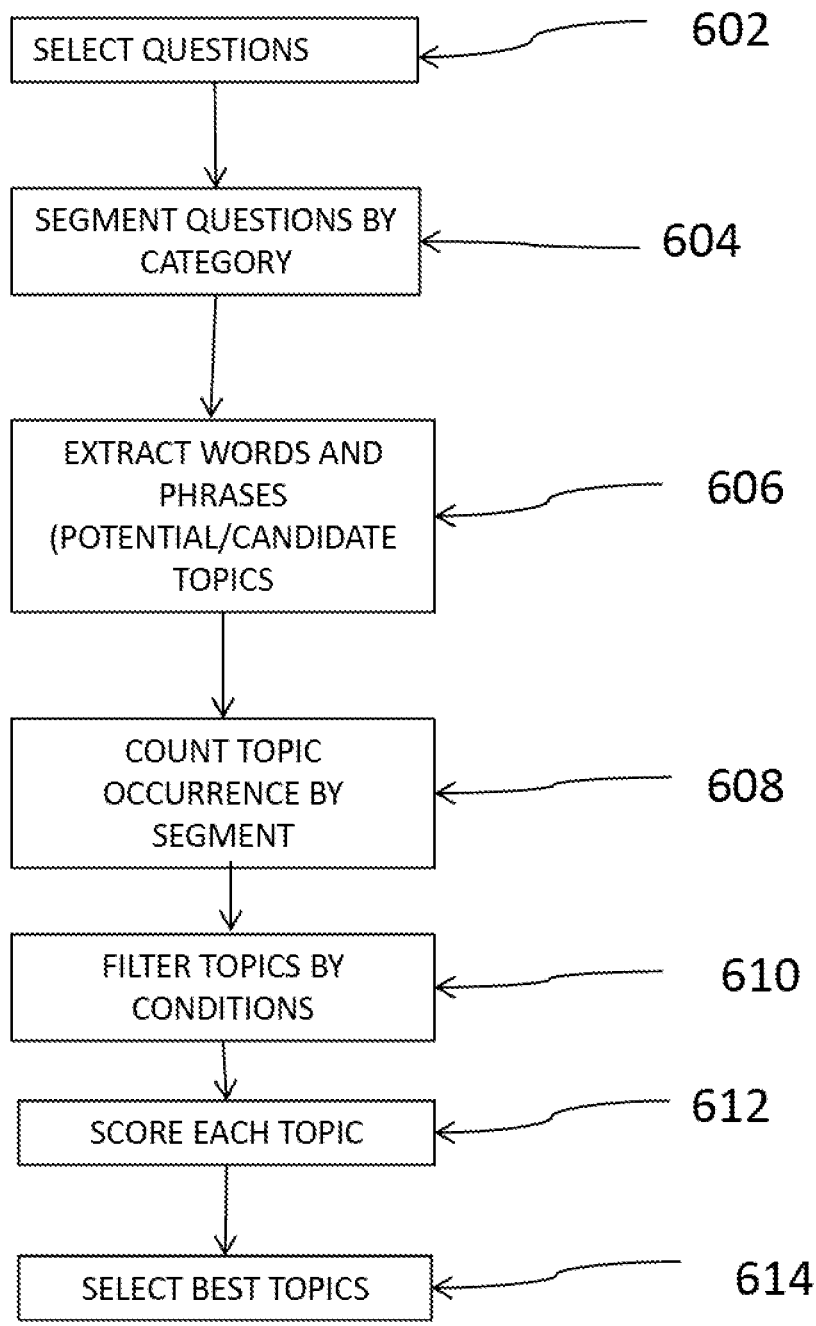
FIG. 6 shows an exemplary flowchart of a method for identifying topics to be used for category promotion.

FIG. 6 shows an exemplary flowchart of a method for identifying topics to be used for category promotion. Referring now to FIG. 6, in operation 602, a group of questions are accessed in the question database for analysis. In operation 604, the questions are segmented by categories. A successful consultation system 102 may receive thousands of questions a day and in many dozens or hundreds of categories and sub-categories. Thus, the segmentation of the questions in the multiple categories is preferably done by the system in an automated fashion. It would be apparent to one of skill in the art that it doesn't really matter how the segmentation is done—one just has to know from the question logs which categories the various questions were answered in.

In operation 606, for each segment, category or sub-category, words and phrases are extracted from the questions corresponding to that segment. In exemplary embodiments, the extraction of words and phrases is performed by the linguistic engine 504.

Next, in operation 608, as previously described, the statistical engine 502, counts the number of occurrence of each word or phrase in that category. The extracted words and phrases correspond to relevant topics and therefore are referred to as candidate topics.

In operation 610, the counted candidate topics are filtered using logical conditions. While the candidate topic counts are done per segment, the application of logical conditions may be applied across categories. The logical conditions may be based on the number of occurrences of candidate topics. For example, the number of occurrences of a candidate topic in a given category must be more than 50 percent. It would be apparent to one of skill in the art that the logical condition applied to filter the topics must be selected based on the specific design requirements for the consultation system.

In operation 612, each filtered topic is scored using the scoring engine 508. Scoring is applied to all candidate topics across all segments. Lastly, in operation 614, the highest score topics are selected as the best or most relevant topics to be used for advertising and category promotion.

Figure 7:
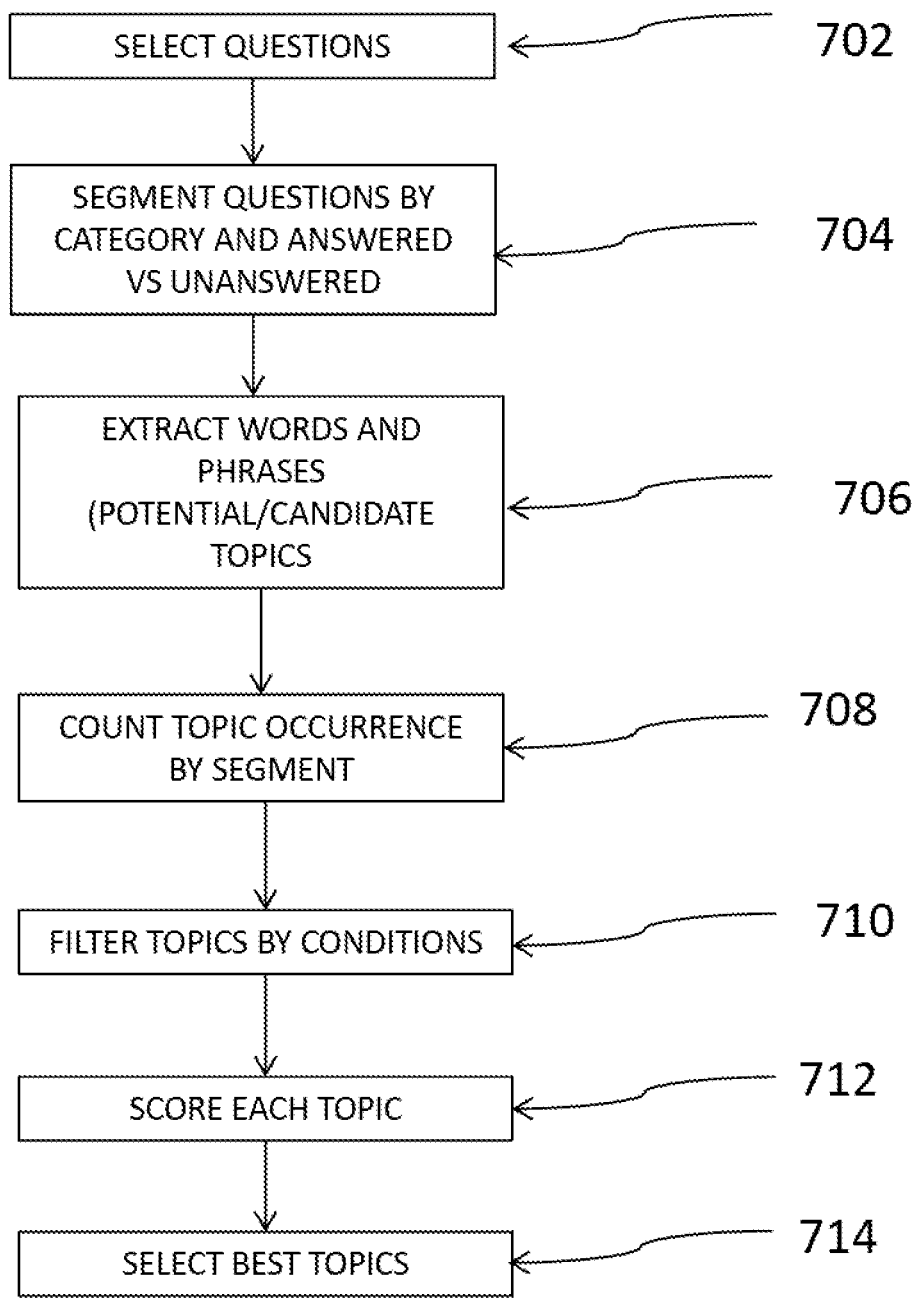
FIG. 7 shows a flow chart of an exemplary method for identifying a set of topics corresponding to underserved or un-served categories.

FIG. 7 shows a flow chart of an exemplary method for identifying a topics corresponding to underserved or un-served categories. Referring now to FIG. 7, in operation 702 a group of questions are selected. In operation 704, the questions are segmented by category. In contrast to the previous process described in operation 604, in 704, the questions are further are divided up between by those questions that received an answer and those questions that did not receive an answer.

In operation 706, words and phrases corresponding to potential or candidate topics are extracted by the linguistic engine 504. In operation 708, for each segment within the unanswered group of questions, the number of occurrences of a given candidate topic is counted. In operation 710, the counted candidate topics are filtered by applying a logical filter condition, using the conditional logic engine 506 as previously described. In operation 712, the scoring engine 508 applies a score to each filtered candidate topic. And finally, in operation 714, the best topics are selected for use.

By segmenting the questions into answered and unanswered groups, and using only unanswered questions for the topic extraction analysis, the best topics selected through this process will correspond to un-served or under-served categories. This is because it is most likely that the questions that remained unanswered either related to topics without a corresponding category or to a category that does not include enough experts with the right qualifications to answer the asked question. Thus, the best topics identified in operation 714 identify un-served or under-served categories.

Figure 8:
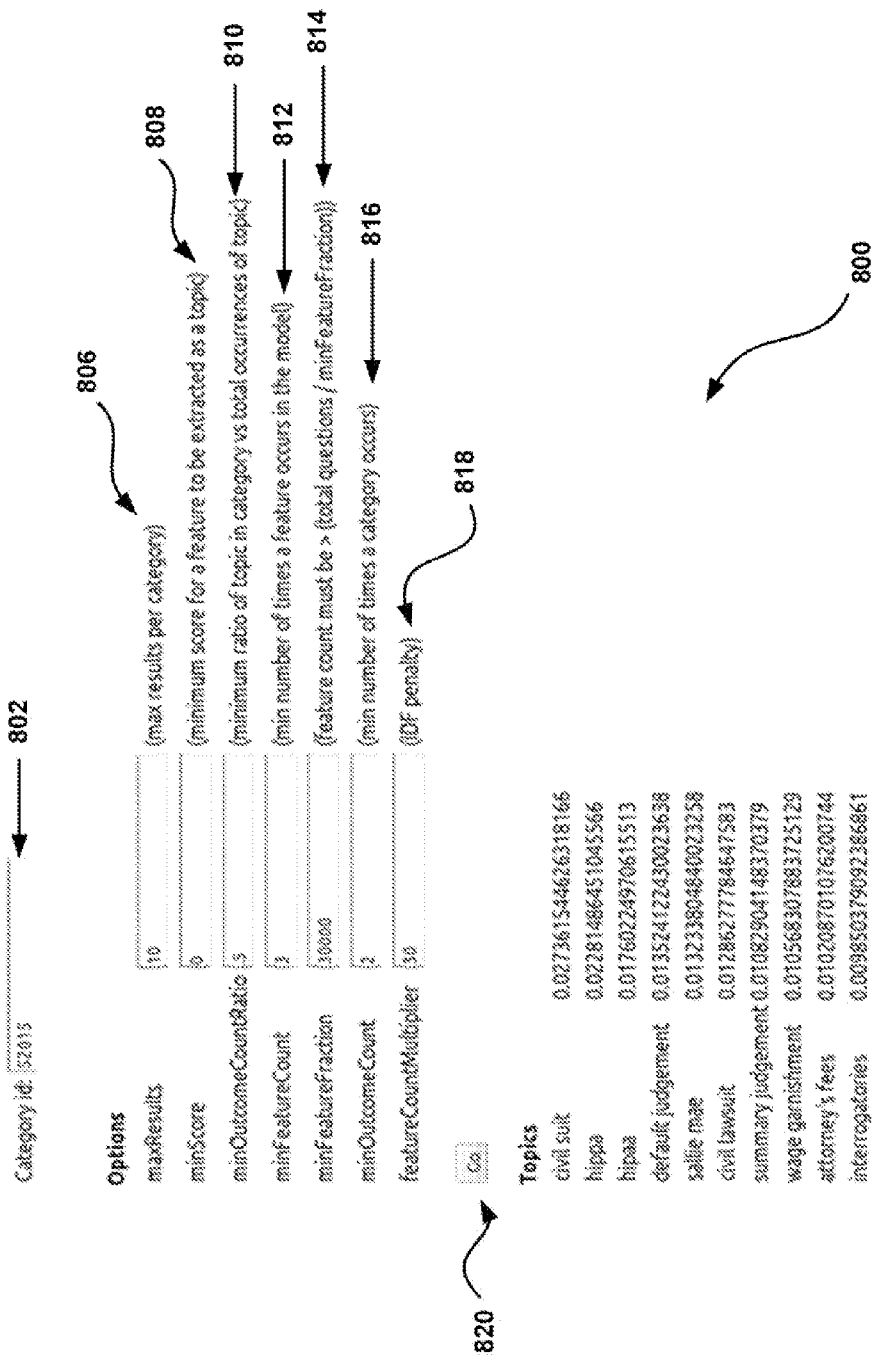
FIG. 8 shows an exemplary interface for a text analysis module.

FIG. 8 shows an exemplary interface for a text analysis module. Using the exemplary interface of the text analysis module 800, the administrator or operator can specify various parameters that affect the operation of the text analysis module 414 as applied to topic extraction. The category indicator 802 shows the category under analysis using the text analysis module 414. Various operational parameter values may set through the "Options" window 804. As shown in this exemplary embodiment, the operational parameters may include the maxResults field 806 used to set maximum number of topics to be extracted for the given category. The minScore field 808 sets the minimum score for a feature to be extracted as a topic. The minScore value is used by the scoring engine 506 to filter out low scoring topics. A minOutcomeCountRatio field 810 allows the administrator to set a minimum ratio of topic in a given category versus the total number of occurrences of the topic in general in order to find topics with high specificity to their category. The value of the minOutcomeCountRatio field 810 may be used by the conditional logic engine 506 to filter the results of topics counted by the Analytical Computational Engine 502. The minFeatureCount 812 sets a value for the minimum number of times a candidate topic must occur in the group of questions for it to be considered. The minFeatureFraction field 814 specifies that a candidate topic must appear more than a required fraction of the total number of questions to be considered. The minOutcomeCount field 816 requires that a category must have at least the minimum number of questions to be included in the analysis for topics. The last field is the featureCountMultiplier 818 parameter that sets the IDF penalty value, which changes the frequency which a candidate topic must appear in other categories to be considered. This has the effect of changing the degree of specificity of the topics within their category. It would be apparent to one of skill in the art that the option interface 804 is one exemplary embodiment of the text analysis interface 800 and other fields may added or removed based on the design requirements of the system and based on the functionalities desired.

Window 820 under the heading "Topics" shows an exemplary output of the text analysis module 414 once all the fields are populated with the appropriate values. As shown in this example, the output is the top ten extracted topics extracted for the given category and includes civil suit, HIPPA, etc. This output may be used to identify categories and topics that are under-served or un-served in the consultation system 102 and allow the creation of the corresponding new category, or recruitment of additional experts with the right qualifications, and promotion of the category through keyword or PPC advertising.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, user, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module or engine should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine Readable Medium

Figure 9:
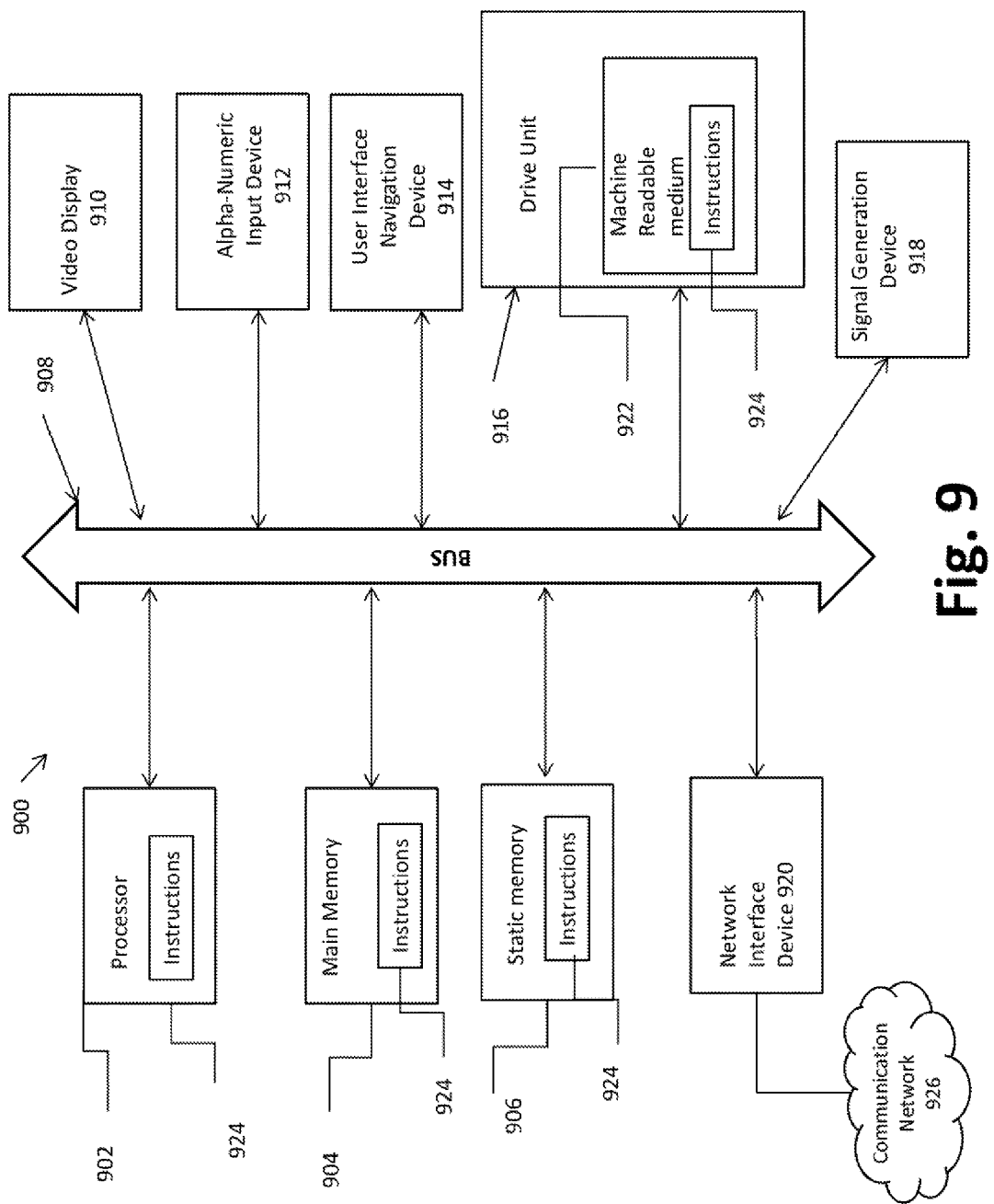
FIG. 9 shows a simplified block diagram of a digital device within which a set of instructions, for causing the machine to perform any one or more of the methodologies discussed herein, may be executed.

With reference to FIG. 9, an exemplary embodiment extends to a machine in the exemplary form of a computer system 900 within which instructions for causing the machine to perform any one or more of the methodologies discussed herein may be executed. In exemplary embodiments, the computer system 900 may be any one or more of the user 106, the expert user 108, affiliate system 110, and servers of the consultation system 102. In alternative exemplary embodiments, the machine operates as a standalone device or may be connected (e.g., networked) to other machines. In a networked deployment, the machine may operate in the capacity of a server or a user machine in server-user network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In exemplary embodiments, the computer system 900 also includes one or more of an alpha-numeric input device 912 (e.g., a keyboard), a user interface (UI) navigation device or cursor control device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, the main memory 904 and the processor 902 also constituting machine-readable media.

While the machine-readable medium 922 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term "machine-readable medium" shall also be taken to include any non-transitory storage medium.

Transmission Medium

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention"

merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method of automatically extracting previously unknown topics from questions submitted to an online consultation system, each question having been posted by a user to one of a variety of subject matter segments to be answered by a subject matter expert, the computer-implemented method comprising using at least one processor to:
   for each posted question in a database of questions posted to the online consultation system:
   perform linguistic analysis to break down the question into component parts and extracts candidate topics, wherein the candidate topics are words and phrases that include semantic meaning, and wherein each posted question is relates to a subject matter segment; and
   for a desired subject matter segment:
   count the frequency of occurrence of each candidate topic within the subject matter segment;
   select the candidate topics whose frequency of occurrence within the subject matter segment is above a first and second popularity threshold;
      score each selected candidate topic with an affinity score, wherein the affinity score quantifies the affinity of each candidate topic to the subject matter segment; and
      identify the selected candidate topics with an affinity score above a third threshold as the best topics for the subject matter segment.

2. The method of claim 1 further comprising:
use the best topics in PPC advertising related the subject matter segment.

3. The method of claim 1 wherein the first threshold is based on the frequency of occurrence of the candidate topic among all posted questions expressed as a percentage.

4. The method of claim 1 wherein the second threshold is based on the frequency of occurrence of the candidate topic among all posted questions expressed as a an absolute number.

5. The method of claim 1 wherein the affinity score is based on a ratio of the frequency of occurrence of the candidate topic in questions posted to the subject matter segment divided by the frequency of occurrence of the candidate topic in all posted questions.

6. A computer-implemented method of extracting previously unknown topics from unanswered questions to identify under-served subject matter segments in an online consultation system, each unanswered question having been posted by a user to one of a variety of subject matter segments to be answered by a subject matter expert, the computer-implemented method comprising using at least one processor to:
   for each posted question in a database of questions posted to the online consultation system:
      perform linguistic analysis to break down the question into component parts and extracts the candidate topics, wherein the candidate topics are words and phrases that include semantic meaning, and wherein each posted question is relates to a subject matter segment;
      segment the questions into answered questions and unanswered questions;
   for a desired subject matter segment:
      count the number of occurrences of the candidate topics within the subject matter segment;
      select the candidate topics whose frequency of occurrence within the subject matter segment is above a first and second popularity threshold;
         score each selected candidate topic with an affinity score, wherein the affinity score quantifies the affinity of each candidate topic to the subject matter segment; and
         identify the selected candidate topics with an affinity score above a third threshold as the best topics for the subject matter segment.

7. The method of claim 6 further comprising:
creating a new category based on the best topics.

8. A computer-implemented method of automatically extracting previously unknown topics from questions submitted to an online consultation system, each question having been posted by a user to one of a variety of subject matter segments to be answered by a subject matter expert, the computer-implemented method comprising using at least one processor to:
   for each posted question in a database of questions posted to the online consultation system:
      perform linguistic analysis to break down the question into component parts and extracts candidate topics, wherein the candidate topics are words and phrases that include semantic meaning, and wherein each posted question is relates to a subject matter segment; and
   for a desired subject matter segment:
   count the frequency of occurrence of each candidate topic within the subject matter segment;
   select the candidate topics whose frequency of occurrence within the subject matter segment is above a first and second popularity threshold;
      score each selected candidate topic with an affinity score, wherein the affinity score quantifies the affinity of each candidate topic to the subject matter segment;
      identify the selected candidate topics with an affinity score above a third threshold as the best topics for the subject matter segment; and use the best topics in PPC advertising related the subject matter segment.

9. A computer-implemented method of extracting previously unknown topics from unanswered questions to identify under-served subject matter segments in an online consultation system, each unanswered question having been posted by a user to one of a variety of subject matter segments to be answered by a subject matter expert, the computer-implemented method comprising using at least one processor to:

for each posted question in a database of questions posted to the online consultation system:
perform linguistic analysis to break down the question into component parts and extracts the candidate topics, wherein the candidate topics are words and phrases that include semantic meaning, and wherein each posted question is relates to a subject matter segment;
segment the questions into answered questions and unanswered questions;
for a desired subject matter segment:
count the number of occurrences of the candidate topics within the subject matter segment;
select the candidate topics whose frequency of occurrence within the subject matter segment is above a first and second popularity threshold;
score each selected candidate topic with an affinity score, wherein the affinity score quantifies the affinity of each candidate topic to the subject matter segment;
identify the selected candidate topics with an affinity score above a third threshold as the best topics for the subject matter segment; and
creating a new category based on the best topics.

* * * * *